Feb. 21, 1950     R. E. LEE     2,497,998
ICE AND SNOW MELTING MAT
Filed May 5, 1949
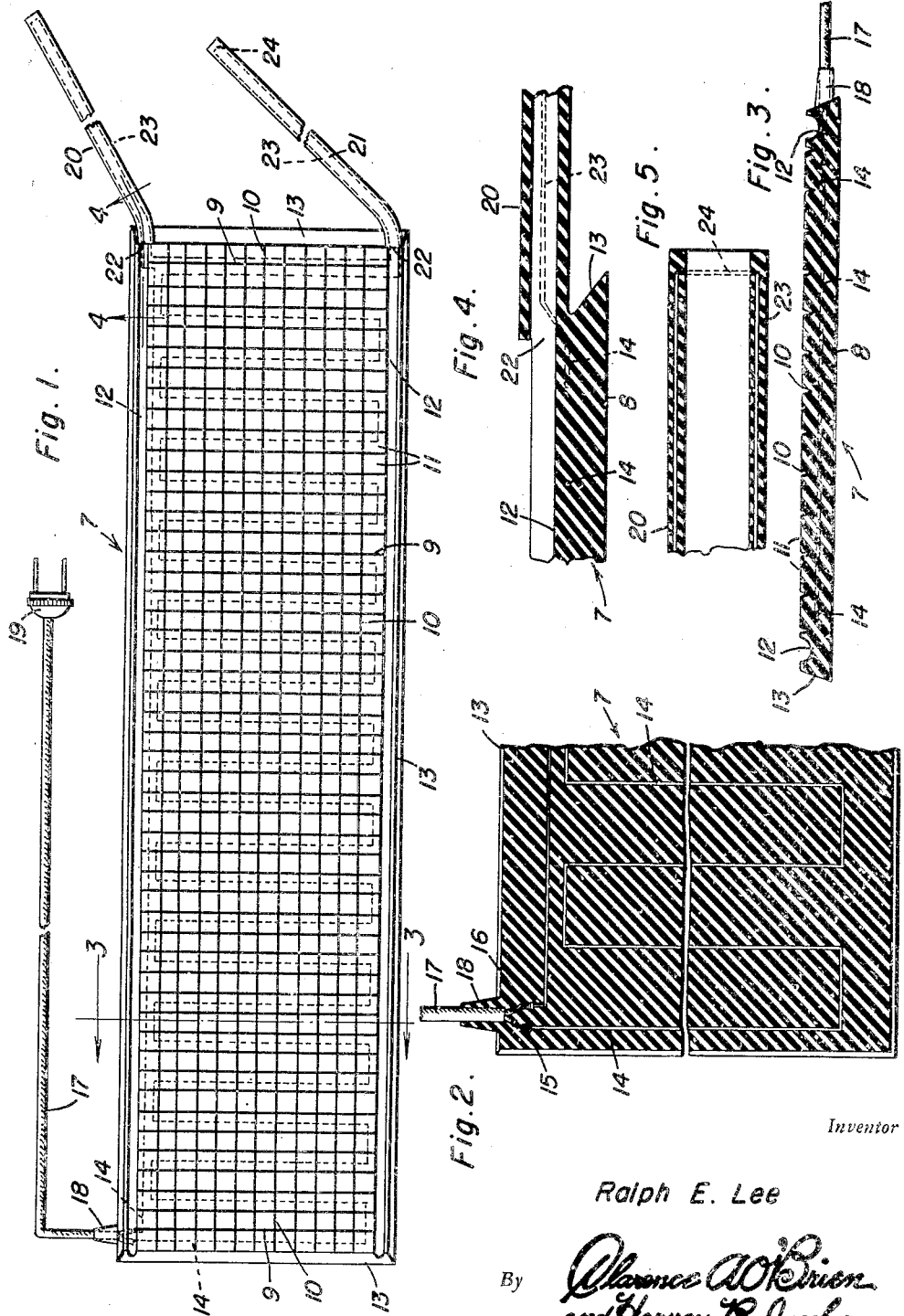
Inventor
Ralph E. Lee

UNITED STATES PATENT OFFICE 2,497,998

ICE AND SNOW MELTING MAT

Ralph E. Lee, Detroit, Mich.

Application May 5, 1949, Serial No. 91,493

2 Claims. (Cl. 219—19)

The present invention relates to an improved heated mat which is usable as an out-of-doors surface cover and which functions to melt ice and snow and to drain the resultant liquid to a convenient point of disposal, for example, a sewer.

My aim, as will be hereinafter apparent, is to employ my novel heated mat on doorsteps, landings and platforms, walkways, garage driveways, road surfaces and the like to thus provide for safe and reliable traversing of such surfaces by motor vehicles and pedestrians.

A more general object of the invention is to provide an electrically heated rubber or equivalent mat of considerable size, as a general rule, to melt and dispose of ice and snow and keep the surface in good shape and, of course, this means that there is really no limit to the uses of such a mat since it could be as is evident, used in place of a tarpaulin over a football field, on certain types of ramps, in automobile garages and the like, on entrances to service stations, on airplane runways and so on and so forth.

Although it is within the scope of the invention to heat the mat by other means I have preferred to employ electric resistance wires such as are used in all sorts of heating pads, to make the mat compressibly resilient and also flexible for convenient rolling and bundling and to provide a satisfactory traction surface as well as drainage gutters.

Other objects and advantages will become more readily apparent from the following description and the accompanying illustrative drawings.

In the drawings, wherein like numerals are employed to designate like parts throughout the same:

Figure 1 is a plan view of a heatable ice and snow melting traction mat constructed in accordance with my invention;

Figure 2 is an enlarged fragmentary sectional view of one end portion of said mat;

Figure 3 is an enlarged cross-section on the line 3—3 of Figure 1, looking in the direction of the arrows;

Figure 4 is an enlarged fragmentary sectional view on the plane of the line 4—4 of Figure 1, looking in the direction of the arrows; and, Figure 5 is a fragmentary longitudinal sectional view through the wire heated discharge end of one of the disposal tubes.

Referring now to the drawings by reference numerals and lead lines, the mat, which is here shown as of general rectangular form, will be constructed of an appropriate grade of rubber possessed of insulating, compressible and flexible properties. As a unit, the mat is denoted by the numeral 7 and has a flat bottom 8 and is substantially flat topped and formed with an appropriate traction surface. I contemplate accomplishing this by having transverse longitudinally spaced grooves 9 intersecting complemental longitudinally extending grooves 10. The grooves not only provide the desired flexible and rollable properties for bundling the mat when latter is not in use but, in addition, define substantially square traction blocks 11 as shown in Figure 3 and, what is more, they function as auxiliary water accumulating and drainage channels. The discharge ends of the transverse channels 9 empty into longitudinal channels 12 which are conveniently referred to as drainage gutters. The gutters are open at opposite ends, as shown in Figure 1. The marginal edges 13 may be bevelled to a desired degree to serve as small ramps when the mat is used on driveways and roads.

Although other heating means may be employed I have found it practical to simply utilize electric current carrying resistance wires 14 properly distributed over the mat and embedded in the mat.

The wire-ends are connected as at 15 and 16 (see Fig. 2) to the current supply wires in a suitable conductor 17 leading through an appropriate neck or nipple 18 formed on the edge of the mat. The conductor is provided with a plug 19 which is adapted to be tapped into a convenient current supply or delivery socket (not shown).

It is desirable, I believe, to carry off and conveniently dispose of surplus water and to accomplish this I provide a pair of disposal hose or tubes 20 and 21. These tubes are the same in construction and the intake end portions 22 register with an adjacent discharge end of the complemental gutter as shown in Figure 5. One of the heating wires 23 is embedded in the tube to range from end-to-end of the tube and is provided with a return bend 24 at the discharge end of the tube, at the right in Figure 1. This is detailed in Figure 5. Each hose or tube will be flexible, of course, and of appropriate length to permit same to be angled and laid upon a surface adjacent the covered surface to carry the surplus water, in downspout fashion, to a sewer or other place of disposal.

By making the mat flexible and compressible and of rubber it performs effectively for good traction and also is susceptible of being rolled and bundled into compact form for storage in an out-of-the-way place when not in use.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. An ice and snow melting surface cover of the class shown and described and adapted to be spread upon walkways, driveways and the like comprising a flexibly resilient mat having substantially flat top and bottom surfaces, having bevelled marginal edge portions, said top surface being provided with intersecting grooves defining block-like pads and auxiliary water distributing channels, said top surface being further provided with open-ended gutters, and open-ended disposal tubes connected with said gutters, and electrically heated resilient wires embedded in said mat.

2. An ice and snow melting surface cover of the class shown and described and adapted to be spread upon walkways, driveways and the like comprising a flexibly resilient mat having substantially flat top and bottom surfaces, said top surface being provided with intersecting grooves defining block-like pads and auxiliary water distributing channels, said top surface being further provided with open-ended gutters, and open-ended disposal tubes connected with said gutters, and electrically heated resilient wires embedded in said mat.

RALPH E. LEE.

REFERENCES CITED

The following references are of record in the file of this patent:

UNITED STATES PATENTS

| Number | Name | Date |
|---|---|---|
| 1,349,136 | Lillard | Aug. 10, 1920 |
| 1,873,601 | Knopf | Aug. 23, 1932 |
| 2,052,644 | Murphy | Sept. 1, 1936 |
| 2,406,367 | Griffith et al. | Aug. 27, 1946 |